March 2, 1948. W. ERNST 2,436,992
SOLENOID WITH PLUNGER
Filed June 16, 1944
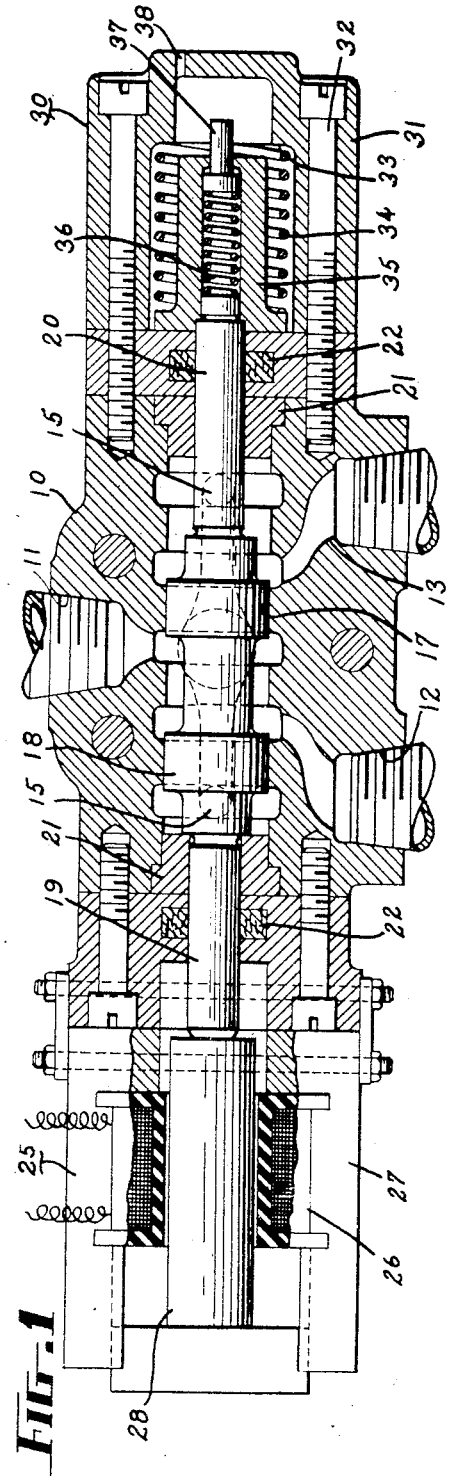
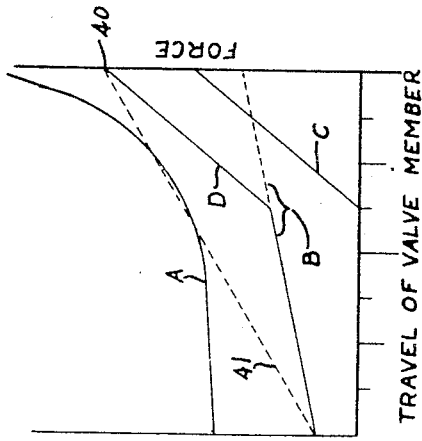
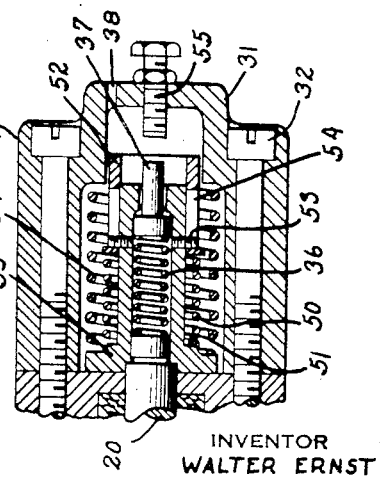
INVENTOR
WALTER ERNST
BY
Toulmin & Toulmin
ATTORNEYS Patented Mar. 2, 1948

2,436,992

UNITED STATES PATENT OFFICE 2,436,992

SOLENOID WITH PLUNGER

Walter Ernst, Mount Gilead, Ohio, assignor to H-P-M Development Corporation, Wilmington, Del., a corporation of Delaware Application June 16, 1944, Serial No. 540,724

4 Claims. (Cl. 175—341)

This invention relates to actuating mechanisms and, in particular, to actuating mechanisms for moving a device from one position to another.

This invention has for its principal object the provision of an actuating mechanism for a reciprocable member which is to be moved from one position to another in which the static friction or tendency of the member to stick in either of the said positions is eliminated.

It is another object of this invention to provide an actuating system for a reciprocable member including yielding means for moving the member in one direction wherein the thrust of the yielding means is variable.

It is another object to provide in a solenoid actuated device a spring return for the said device wherein the thrust of the spring substantially parallels the thrust of the solenoid.

It is still another object of the invention to provide a valve structure comprising a reciprocable valve member in connection with a solenoid and a spring return, in which the tendency of the valve member to stick in either end position is substantially eliminated.

These and other objects and advantages of this invention will be more apparent from the following specification in connection with the accompanying drawings in which:

Figure 1 is a section through a valve having an actuating system according to this invention;

Figure 2 is a graph illustrating the thrusts or forces developed by the actuating mechanism;

Figure 3 shows a somewhat modified structure of a portion of the actuating device; and Figure 4 is a modification employing a single spiral spring.

Referring to the drawings in detail, the structure illustrated in Figure 1 comprises a valve body or casing 10 having therein an inlet port 11, service ports 12 and 13 and outlet ports 15.

The body 10 is centrally bored as at 17 and has reciprocably mounted therein the valve member 18. The valve member 18 comprises spaced piston portions connected with a reduced diameter portion and carries on the ends thereof the extensions 19 and 20 which are adapted to be engaged by the valve actuating mechanism. The bore 17 of the valve casing 10 is suitably closed and sealed at either end thereof as by the apertured closure members 21 and the seals 22.

Attached to the left end of the body 10 by any suitable means is an electromagnet generally indicated at 25 which comprises a coil 26, a frame structure 27 and a movable armature 28. The armature 28 is adapted to engage the extension 19 of the valve member 18.

Attached to the right hand end of the valve body 10 is a yielding means generally indicated at 30 which comprises a chamber 31 attached to the body 10 in any suitable manner such as by the cap screws 32. The chamber 31 is hollow and comprises a shoulder 33 against which a spring 34 bears. The opposite end of the spring 34 bears against a shoulder on a cup shaped member 35 which abuts or is attached to the extension 20 of the valve member 18. The member 35 is hollow and has arranged therein a spring 36 which bears, on one end, against the extension 20 and, on the other end, against the head of a plunger 37 which extends through an aperture in the lower end of the member 35. The chamber 31 may be vented by a port 38 if desired.

Referring to Figure 2, the thrust developed by the electromagnet 25 and the yielding means 30 are plotted against the travel of the valve member 18. In this graph the curve at A indicates the thrust developed by the electro-magnet 25 as the armature thereof moves from left to right. The lines at B and C indicate, respectively, the thrusts developed by the springs 34 and 36 during the rightward movement of the valve member 18 while the line D indicates the resultant thrust on the valve member 18 of the springs 34 and 36.

In operation, the valve member 18 normally occupies the position shown in Figure 1. In this position fluid communication is had between the inlet port 11 and the service port 12 and between the service port 13 and the exhaust port 15. When it is desired to effect fluid communication between the inlet port 11 and service port 13 while simultaneously exhausting the service port 12, electrical energy is supplied to the coil 26 of the electromagnet 25 thereby urging the armature 28 thereof rightwardly.

As the armature 28 moves to the right, the valve member 18 also moves to the right and compresses the spring 34. After a predetermined rightward movement of the armature and the valve member, the plunger 37 engages the right hand end of the chamber 31 thereby stopping the said plunger so that continued rightward movement of the valve member 18 compresses the spring 36. When it is desired to restore the valve member 18 to its Figure 1 position, the coil 26 is deenergized.

Referring now to Figure 2 it will be seen that the thrust created by the electromagnet 25 commences at a predetermined value when the armature 28 is in its left hand position and rises at an ever increasing rate as the armature 28 and valve member 18 move to the right. It will be apparent that, if the initial thrust of the solenoid as indicated by the intercept of the curve A with the vertical axis of the graph is sufficient to initiate movement of the valve member 18, the final thrust of the said electromagnet is greatly in excess of that required to maintain the valve member 18 in its shifted position.

If, now, it is desired to urge the valve member 18 leftwardly with a thrust indicated at the point 40 which is the intercept on the vertical axis of the graph on the line D, it will be apparent that a single spring for creating the said thrust would cause the actuating mechanism to be inoperative. This will be apparent by the dashed line 41 which indicates the characteristics of a spring which would urge the valve member 18 leftwardly with the proper thrusts when the said valve member is in its end positions. The dashed line 41 is intercepted by the curve A indicating that the thrusts of the electromagnet 25 and the spring would be in a state of balance before the valve member was completely shifted. Accordingly, this invention provides the additional spring 36 which is effective, in combination with the spring 34, to urge the valve member 18 from its left hand position with a thrust equal to that represented by the point 40 but, since the spring 36 is effective through only a portion of the stroke of the member 18, the combined thrusts of the springs is never equal to the thrust of the electromagnet 25. The combined thrusts of the springs is, therefore, substantially proportional to the thrust of the electromagnet 25.

Referring to Figure 3, a modified arrangement of the yielding means 30 is shown. In this view a third spring 50 is provided which bears against the shoulder 51 on the member 35 and also against a sleeve 52 which is reciprocable over the member 35 and is retained in position thereon by the screws 53. The screws 53 are adapted to slide in slots 54 provided in the sleeve 52.

The operation of the modification shown in Figure 3 is as follows:

When the electromagnet 25 is energized moving the valve member 18 to the right, the spring 34 is first compressed through a predetermined portion of the stroke, the plunger 37 then engages the adjustable screw 55 and the spring 36 is compressed through another predetermined portion of the stroke and, finally, the sleeve 52 engages the right hand wall of the chamber 31 and the spring 50 is compressed through the remainder of the stroke of the member 18. It will be apparent that, by the proper selection of spring values, the line indicating the resultant thrust of the springs on the member 18 will even more closely approximate the shape of the curve A than does the spring arrangement of Figure 1.

In Figure 4 there is illustrated a modified structure in which the spring means comprises a single conical spring. The spring 60 bears against a plate 61 on the extension 20 and develops a thrust which substantially parallels the thrust of the electromagnet.

It will be apparent that this invention is not limited to the actuation of a reciprocable valve member but may be advantageously employed for the actuation of any other reciprocable member which is to be moved from one position to another. Likewise, it will be apparent that, for the purposes of this invention, reciprocation does not necessarily indicate movement in a linear path but could as well be construed to mean curvilinear movement.

Accordingly, it is not desired that this invention be limited to the specific construction shown in the drawings but such modifications in structure and arrangement and such substitution of equivalents as may be made without departing from the scope of the claims and the invention are desired to be comprehended.

Having thus fully described my invention, what I claim as new and desire to secure by Letters Patent, is:

1. In combination with a member reciprocable between end positions wherein it is subject to friction tending to retain it in said end positions; an actuating device comprising an electromagnet having an armature movable therein and connected with said member and operable when said electromagnet is energized to move said member in one direction into one of said end positions, a fixed abutment, a first spring means bearing between said member and said abutment and adapted continuously to urge the said member in the other direction, a second abutment carried by said member and movable relative thereto and positioned between said member and said fixed abutment, and a second spring bearing between said member and said second abutment, said abutments being adapted for engagement during movement of said member toward said one end position whereby the movement of said member by said armature is opposed first by said first spring and then by both of said springs, said actuating device being characterized by a force curve which increases in magnitude as said armature is moved by the energization of said electromagnet.

2. In combination with a member reciprocable between end positions wherein it is subject to static friction tending to retain it in said end positions; an actuating device therefor comprising electromagnetic means for moving said member in one direction toward one of said end positions, a first fixed abutment, a first spring bearing between said member and said first abutment and adapted continuously to urge said member in the opposite direction, a plurality of other abutments movably carried by said member, and a plurality of other springs bearing respectively between said member and said other abutments, said other abutments being adapted successively to engage and be halted by said fixed abutment at predetermined spaced points in the travel of said member toward said one end whereby said springs become successively effective and the combined thrust thereof is at all times substantially proportional to the thrust of said electromagnet, said electromagnet being characterized by a force curve which increases in magnitude during the movement of said member in said one direction.

3. In combination with a reciprocable member movable between end positions; an actuating device therefor comprising an electromagnet and an armature, the said armature being connected with said member for moving the same in one direction when said electromagnet is energized, a first spring bearing between fixed abutment, a first spring bearing between said member and said fixed abutment and continuously urging said member in the opposite direction, a plurality of other abutments movably carried by said member, a plurality of other springs bearing respectively between said other abutments and said member and urging the said other abutments toward said fixed abutment, stop means on said member for stopping said other abutments at different distances from said fixed abutment, said other abutments being adapted for engagement with said fixed abutment during the movement of said member in said one direction whereby said springs become successively effective and the combined thrust thereof is substantially proportional to the thrust of said actuating device.

4. In combination with a reciprocable member movable between end positions; an actuating device therefor comprising an electromagnet and an armature, the said armature being connected with said member for moving the same in one direction when said electromagnet is energized, a fixed abutment, a first spring bearing between said member and said fixed abutment and continuously urging said member in the opposite direction, a plurality of other abutments movably carried by said member, a plurality of other springs bearing respectively between said other abutments and said member and urging the said other abutments toward said fixed abutment, stop means on said member for stopping said other abutments at different distances from said fixed abutment, said other abutments being adapted for engagement with said fixed abutment during the movement of said member in said one direction whereby said springs become successively effective and the combined thrust thereof is substantially proportional to the thrust of said actuating device, and means of selectively adjusting the point of engagement of at least one of said other abutments with said fixed abutment.

WALTER ERNST.

REFERENCES CITED

The following references are of record in the file of this patent:

UNITED STATES PATENTS

| Number | Name | Date |
|---|---|---|
| 733,315 | Dodgson | July 7, 1903 |
| 871,378 | Thullen | Nov. 19, 1907 |
| 1,092,718 | Johnson | Apr. 7, 1914 |
| 1,662,098 | Anderson | Mar. 13, 1928 |
| 1,872,382 | Aalborg | Aug. 16, 1932 |
| 1,897,490 | Noble | Feb. 14, 1933 |
| 2,016,604 | Karnell | Oct. 8, 1935 |
| 2,187,998 | Carpenter | Jan. 23, 1940 |
| 2,209,608 | Nye | July 30, 1940 |
| 2,216,518 | Parsons | Oct. 1, 1940 |
| 2,278,967 | Allen | Apr. 7, 1942 |
| 2,329,743 | Cameron | Sept. 21, 1943 |
| 2,330,407 | Claytor | Sept. 28, 1943 |
| 2,345,213 | O'Shei | Mar. 28, 1944 |